United States Patent [19]

Harrington

[11] 4,312,295
[45] Jan. 26, 1982

[54] CAT BOX LITTER SCREENING DEVICE

[76] Inventor: Duane E. Harrington, 365 Crestmont Dr., San Francisco, Calif. 94131

[21] Appl. No.: 80,547

[22] Filed: Oct. 1, 1979

[51] Int. Cl.³ ............................................. A01K 29/00
[52] U.S. Cl. ......................................................... 719/1
[58] Field of Search .................... 119/1; 220/405, 406, 220/407

[56] References Cited

U.S. PATENT DOCUMENTS

| | | | |
|---|---|---|---|
| 3,227,137 | 1/1966 | Goldman et al. | 119/1 |
| 3,448,913 | 6/1969 | Wolff | 220/407 X |
| 3,757,990 | 9/1973 | Buth | 220/404 |
| 3,809,013 | 5/1974 | Rigney et al. | 119/1 |
| 3,831,557 | 8/1974 | Elesh | 119/1 |

*Primary Examiner*—Robert Peshock
*Assistant Examiner*—Robert P. Swiatek

[57] ABSTRACT

A liner for use in a litter box or tray for cats, which is of conventional design having sides and a bottom, the liner having a plurality of flexible sieve sheets overlying a flexible impervious sheet, sheets being removeably attached to an underlying semi-rigid support, and being of such size as to overlap the sides of the litter box, the support having an attachment device for attaching the support to the bottom of the litter box, such that when litter is placed in the box over the liner packet, the sieve sheets are periodically removed to remove fecal matter by screening and aerating the litter, and lastly the impervious sheet is removed to remove and discard the litter before replacement with a new liner packet and new litter whereby the period over which litter is usable is substantially extended.

20 Claims, 7 Drawing Figures

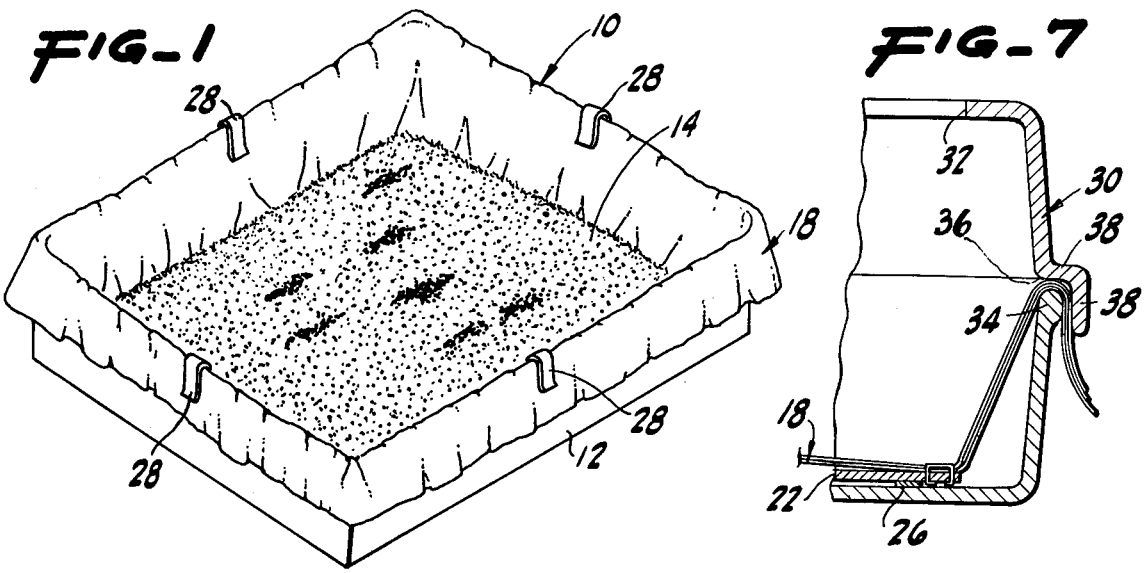
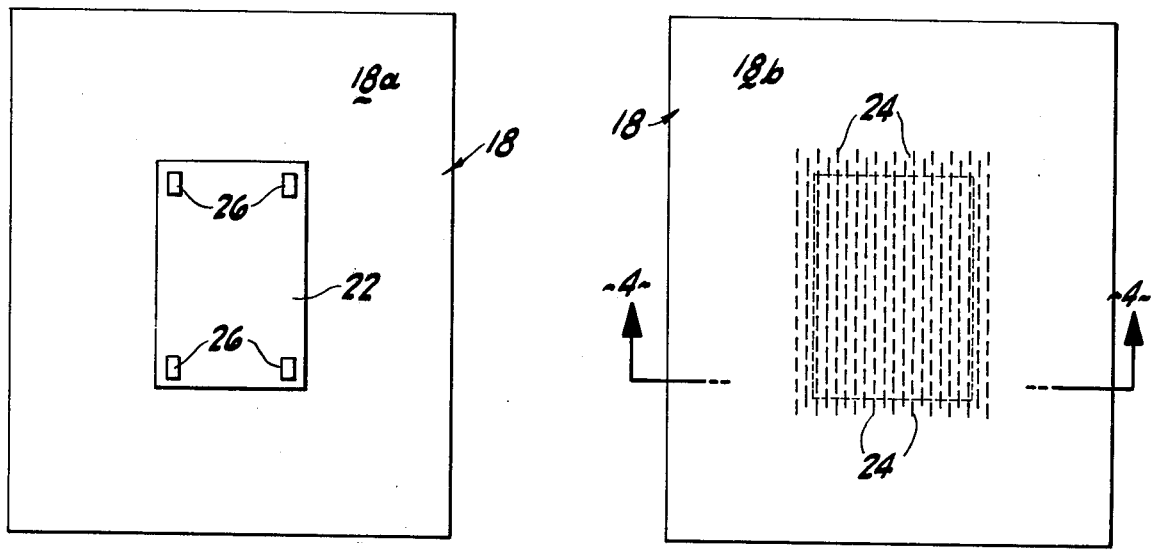
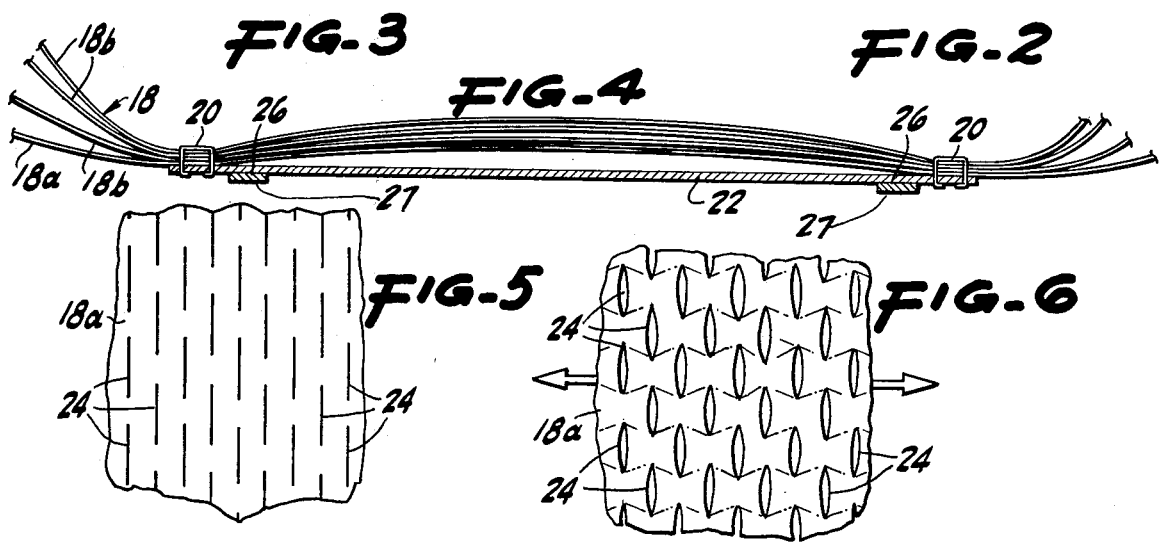

CAT BOX LITTER SCREENING DEVICE

BACKGROUND OF THE INVENTION

The cat litter box liner of this invention is designed to extend the useful life of the litter in the litter box by screening the litter of fecal matter. It has been the common practice to provide a litter box or tray for household cats which have limited opportunity to take care of their biological demands outside. The litter box is conventionally a metal or plastic open container with a flat bottom and low, often sloping sides. Some modern litter boxes have a curved deflection screen mountable around the rim of the box to prevent litter from being cast out of the box during the instinctive coverup of excrement by a cat.

Litter used in the litter box is usually a granular material that is highly absorbant. One preferred material is diatomacious earth. Generally, the litter becomes quickly contaminated with fecal matter that emits a noxious odor before the absorbant properties of the litter are fully utilized. Often at this point a cat will refuse to use the box. It is the present practice to simply discard the litter when this occurs and refill the box with fresh litter.

SUMMARY OF THE INVENTION

This invention relates to a screening device for separating large fecal matter from litter in a litter box for cats. The screening device comprises one or more sieve sheets placed on the bottom of the litter box under the litter. When fecal matter has accumulated in the box, a sieve sheet is carefully drawn up through the litter such that the litter falls back into the box and the fecal matter is retained by the sieve sheet. Both the sieve sheet and unwanted fecal matter are discarded.

In the preferred embodiment the sieve sheets are provided with means to retain them at the box bottom until removed, preventing accidental dislocation by a cat performing excavation or coverup tasks. Additionally, the sheets are in a packet form with an underlying impervious sheet which enables removal of all matter in the box prior to replacement with a new liner packet and fresh litter. For convenient handling the lightweight, flexible sheets used in the preferred embodiment are fastened to an underlying cardboard form which in turn is securable to the bottom of the litter box.

While various web-like or screen-like constructions can be used for the sieve sheet, it has been found that a perforated plastic sheet having multiple series of linear slits has operational advantages in that the holes in the sheets do not become apparent until the sheets are in a transverse tension to the linear slits. Thus, when dormant at the bottom of the litter box, this type of sheet will not tend to pass litter but rather maintain the litter on top of the sheet packet thereby inhibiting a possible upward drift of the sheet.

These and other features will become apparent from a detailed consideration of the preferred embodiment.

BRIEF DESCRIPTION OF THE DRAWINGS

FIG. 1 is a perspective view of the liner packet in use in a litter box.

FIG. 2 is a top view of the liner packet showing the sieve sheet.

FIG. 3 is a bottom view of the liner packet showing the cardboard support.

FIG. 4 is a cross sectional view taken on the lines 4—4 of FIG. 2.

FIG. 5 is an enlarged view of a portion of the sieve sheet in a dormant condition.

FIG. 6 is an enlarged view of a portion of the sieve sheet in a stretched condition.

FIG. 7 is a side elevational view partially in cross section of the liner packet in use in a modified litter box.

DETAILED DESCRIPTION OF THE PREFERRED EMBODIMENT

Referring to FIG. 1, the liner packet designated generally by the reference numeral 10 is shown positioned for use in a cat litter box 12 partially filled with cat litter 14. Liner packet 10 is sufficient in size to cover the bottom and overlap the sides of the litter box 12. As shown in FIGS. 2–4, the liner packet 10 comprises a series of flexible, plastic sheets 18 fastened by staples 20 to a semi-rigid, cardboard support or pad 22. The bottom sheet 18a is impervious and functions as a protective liner in a litter box, preventing the box from becoming contaminated during use. The remaining upper sheets, here three in number, are sieve sheets 18b with web-forming holes or slits 24 to allow granular litter to pass through the sheets when the sheets are individually drawn up through the litter during removal of fecal matter from the litter box.

The cardboard support 22 maintains the spread of the sheets across the bottom of the litter box and provides a means for removably securing the sheets to the litter box. As shown in FIG. 3, the cardboard support has four, double surface stick, tape segments 26 secured to the undersurface of the cardboard support. Prior to use the tape segments are protected with a peel-off film 27 which is removed to expose the adhesive surface. The tape segments 26 can be replaced with patches of contact adhesive similarly covered by a film until use.

Once the film is removed and the packet is placed in the bottom of the litter box, the litter box is filled with the desired quantity of granular absorptive material commonly sold as cat litter or kitty litter. As the litter becomes contaminated with fecal matter, the sieve sheets are easily separated from the staples 20 by a slight local tearing of the sheet, and removed along with the unwanted fecal matter. Drawing the sieve sheet up through the litter has the effect of bringing litter at the bottom of the tray up to the surface and of loosening and aerating the litter allowing moist litter to dry.

While any screen-like material may be used for the sieve sheets, a multi-slit vegetable bag material has been found to have certain unexpected advantages. The material comprises a thin plastic sheet with perforations formed by multiple rows of short spaced slits 24, $\frac{1}{2}$–$\frac{3}{4}$ of an inch in length. When lying flat on the litter box bottom the slits are essentially closed as shown in FIG. 5. In this condition the granular litter does not become emeshed in the perforations of the several sheets resulting in an entrapment of a portion of the litter and an upward drift to the perforated sheets. However, when the sheets are removed and a cross tension is placed on the sheets as shown in FIG. 6, the slits 24 open allowing easy passage of the granular litter therethrough, but retention of the fecal matter.

In addition, the ease of fabricating the slit material allows selective placement of the slits in the center portion of the sheet as shown in FIG. 2. In this manner, litter is confined by the unslit sides on screening thereby preventing spillage.

The liner packet of this invention is designed to be used with a variety of different styles of litter boxes. As shown in FIG. 1, where a conventional shallow box or a tray is used, the overlapping portions of the sheets may be clipped to the rim of the box by metal clips 28, as shown, or by conventional clothes pins. When a litter box is used with a partially enclosed cover or shield supported on the rim of the litter box, the cover or shield will adequately retain the overlapping portions of the sheets. Such an alternative arrangement for retaining the liners over the top of the sides is shown in FIG. 7 where litter box 12 includes a cover shield 30 with an opening 32 for access. The cover shield has a butt seat 36 which compresses the liners against the top of the cover shield rim 34 of the litter box, and an overlapping depending lip 38 to secure to the box. In this manner, the liners are retained to the box rim and are prevented from being dislodged or dislocated. The impervious liner enables fabrication of a litter box with cover from cardboard. The box cover can be of conventional overlapping design without a butt seat as in the molded plastic embodiment of FIG. 7. A cardboard embodiment with cover could employ a cutout portion of the cover as the support pad for attaching the sheets to the litter box or alternately can be assembled with the sheets attached directly to the box bottom by staples or the like.

When the liner packet described herein is used, the useful life of the litter is increased substantially. As a result, a highly absorbant litter, which is customarily more expensive, can be used with economy. Further, in extending the useful life of the litter, additives to the litter, such as neutralizing chemicals for the urine, deodorants, and/or antimicrobial and flea control chemicals might be economically justifiable.

While in the foregoing specification embodiments of the present invention have been set forth in considerable detail for the purposes of making a complete disclosure of the invention, it will be apparent to those of ordinary skill in the art that numerous changes may be made in such details without departing from the spirit and principles of the invention.

What is claimed is:

1. A cat litter box for extending the useful life of cat litter in a cat litter box by removal of fecal matter therefrom comprising: screening means for screening the cat litter of the fecal matter wherein said screening means comprises at least one sieve sheet having a plurality of holes sized for passage of the litter and retention of fecal matter; and,
    means for attaching said sieve sheet to a cat litter box wherein said means for attaching said sieve sheet to a cat litter box comprises a pad having means for attaching said sieve sheet to said pad and means for attaching said pad to the cat litter box.

2. The cat litter box liner of claim 1 comprising further, an impervious sheet forming a protective liner for the cat litter box positioned in conjunction with, and underlying said sieve sheet wherein said sieve sheet is separable from said impervious sheet.

3. The cat litter box liner of claim 2 wherein said sieve sheet and said impervious sheet are both attached to said pad.

4. The cat litter box liner of claim 3 having a plurality of sieve sheets.

5. The cat litter box liner of claim 4 wherein said holes are linear slits confined to a central portion of said sheet.

6. The cat litter box liner of claim 2 wherein the cat litter box has a bottom and sides and said sieve sheet and impervious sheet are sized to cover the bottom and overlap the sides of the litter box.

7. The cat litter box liner of claim 6 in combination with retainer means for retaining the overlapping sheets on the sides of the litter box to the litter box.

8. The cat litter box liner of claim 7 wherein said retainer means comprises clip members which engage said sheets and sides of the litter box clipping said sheets to the sides of the litter box.

9. The cat litter box liner of claim 1 in combination with a cat litter box having a bottom and sides.

10. The cat litter box liner of claim 1 wherein said sieve sheet comprises a thin plastic material having a plurality of linear slits wherein said linear slits comprise said holes upon applying a tension to said material transverse to said slits.

11. The cat litter box liner and litter box of claim 9 wherein said linear slits are confined to a central portion of said sheet.

12. A cat litter box liner for extending the useful life of cat litter in a cat litter box by removal of fecal matter therefrom in combination with a cat litter box having a bottom and sides wherein the liner comprises:
    at least one sieve sheet having a plurality of holes sized for passage of the litter and retention of fecal matter; and,
    means for attaching said sieve sheet to said cat litter box wherein said means for attaching said sieve sheet to said cat litter box comprises a pad having means for attaching said sieve sheet to said pad and means for attaching said pad to said cat litter box.

13. The cat litter box liner and litter box of claim 12 comprising further, an impervious sheet forming a protective liner for said cat litter box positioned in conjunction with said sieve sheet and underlying said sieve sheet wherein said sieve sheet is separable from said impervious sheet.

14. The cat litter box liner and litter box of claim 13 wherein both said sieve sheet and said impervious sheet are attached to said pad and said pad is attached to said cat litter box.

15. The cat litter box liner and litter box of claim 14 having a plurality of sieve sheets.

16. The cat litter box liner and litter box of claim 13 wherein said cat litter box has a bottom and sides and said sieve sheet and impervious sheet are sized to cover the bottom and overlap the sides of said litter box.

17. The cat litter box liner and litter box of claim 16 in further combination with retainer means for retaining the overlapping sheets on the sides of said litter box to said litter box.

18. The cat litter box liner and litter box of claim 17 wherein said retainer means comprises clip members which engage said sheets and sides of said litter box, clipping said sheets to the sides of said litter box.

19. The cat litter box liner and litter box of claim 17 wherein said retainer means comprises a litter box cover shield having an overlapping structure engaging the sides of said litter box, wherein said sheets are retained between said overlapping structure and the sides of said litter box.

20. The cat litter box liner and litter box of claim 12 wherein said sieve sheet comprises a thin plastic material having a plurality of linear slits wherein said linear slits comprise said holes upon applying a tension to said material transverse to said slits.

* * * * *